(12) United States Patent
Brown

(10) Patent No.: US 8,985,417 B2
(45) Date of Patent: Mar. 24, 2015

(54) BICYCLE GARMENT CARRIER ATTACHMENT

(71) Applicant: Daniel Jason Brown, Greenville, NH (US)

(72) Inventor: Daniel Jason Brown, Greenville, NH (US)

(*) Notice: Subject to any disclaimer, the term of this patent is extended or adjusted under 35 U.S.C. 154(b) by 0 days.

(21) Appl. No.: 13/873,145

(22) Filed: Apr. 29, 2013

(65) Prior Publication Data

US 2013/0284782 A1    Oct. 31, 2013

Related U.S. Application Data

(60) Provisional application No. 61/639,978, filed on Apr. 29, 2012.

(51) Int. Cl.
  *B62J 7/00*  (2006.01)
  *B62J 9/00*  (2006.01)
  *B62J 7/02*  (2006.01)
  *B62J 7/04*  (2006.01)

(52) U.S. Cl.
  CPC .... *B62J 7/02* (2013.01); *B62J 7/04* (2013.01); *B62J 9/001* (2013.01)
  USPC .......................................... 224/427; 224/431

(58) Field of Classification Search
  USPC ................ 224/322, 427, 431, 447, 459, 413; 190/111; 206/279, 287.1
  See application file for complete search history.

(56) References Cited

U.S. PATENT DOCUMENTS

| | | | | | |
|---|---|---|---|---|---|
| 2,365,303 | A | * | 12/1944 | Smith | 206/285 |
| 2,671,706 | A | * | 3/1954 | Greengold | 312/4 |
| 2,876,054 | A | * | 3/1959 | Beede | 312/3 |
| 2,926,827 | A | * | 3/1960 | James | 224/551 |
| 3,051,302 | A | * | 8/1962 | Crowley | 206/282 |
| 3,612,232 | A | * | 10/1971 | Larson | 206/287 |
| 4,094,414 | A | * | 6/1978 | Thiot et al. | 211/1.3 |
| 4,390,087 | A | * | 6/1983 | Goldfinger | 206/287 |
| 4,502,576 | A | * | 3/1985 | Reardon | 190/18 R |
| 4,542,824 | A | * | 9/1985 | Allen | 206/287.1 |
| 4,738,360 | A | * | 4/1988 | King et al. | 206/287.1 |
| 4,860,981 | A | * | 8/1989 | Pierson | 248/97 |
| 5,000,582 | A | * | 3/1991 | Pierson | 383/7 |
| 5,018,609 | A | * | 5/1991 | Brenner | 190/108 |
| 5,071,003 | A | * | 12/1991 | Freelander | 206/282 |
| 5,161,656 | A | * | 11/1992 | Brenner | 190/111 |
| 5,320,220 | A | * | 6/1994 | Purkiss | 206/287.1 |
| 5,961,017 | A | * | 10/1999 | Mehler | 224/576 |
| 6,120,050 | A | * | 9/2000 | Tillim | 280/293 |
| 6,431,422 | B1 | * | 8/2002 | Moore et al. | 224/427 |
| 6,488,302 | B2 | * | 12/2002 | Coates | 280/293 |
| 6,712,376 | B2 | * | 3/2004 | Eberhardt et al. | 280/293 |
| 2010/0108834 | A1 | * | 5/2010 | Rigas | 248/213.1 |

* cited by examiner

*Primary Examiner* — Justin Larson
*Assistant Examiner* — Lester L Vanterpool

(57) ABSTRACT

A hanged garment device can semi-permanently attach to the back of a bicycle to securely stow hanged garments in a removable, aerodynamic pod. Because the hanged garment device is shaped to reduce wind resistance and can rotate to accommodate change in wind direction, the hanged garment device does not hinder bike stability during travel. The hanged garment device does not disrupt bicyclist stability during shifts in the wind while allowing hanged garments to be stowed securely on the bicycle, typically behind the bicyclist during travel.

9 Claims, 3 Drawing Sheets

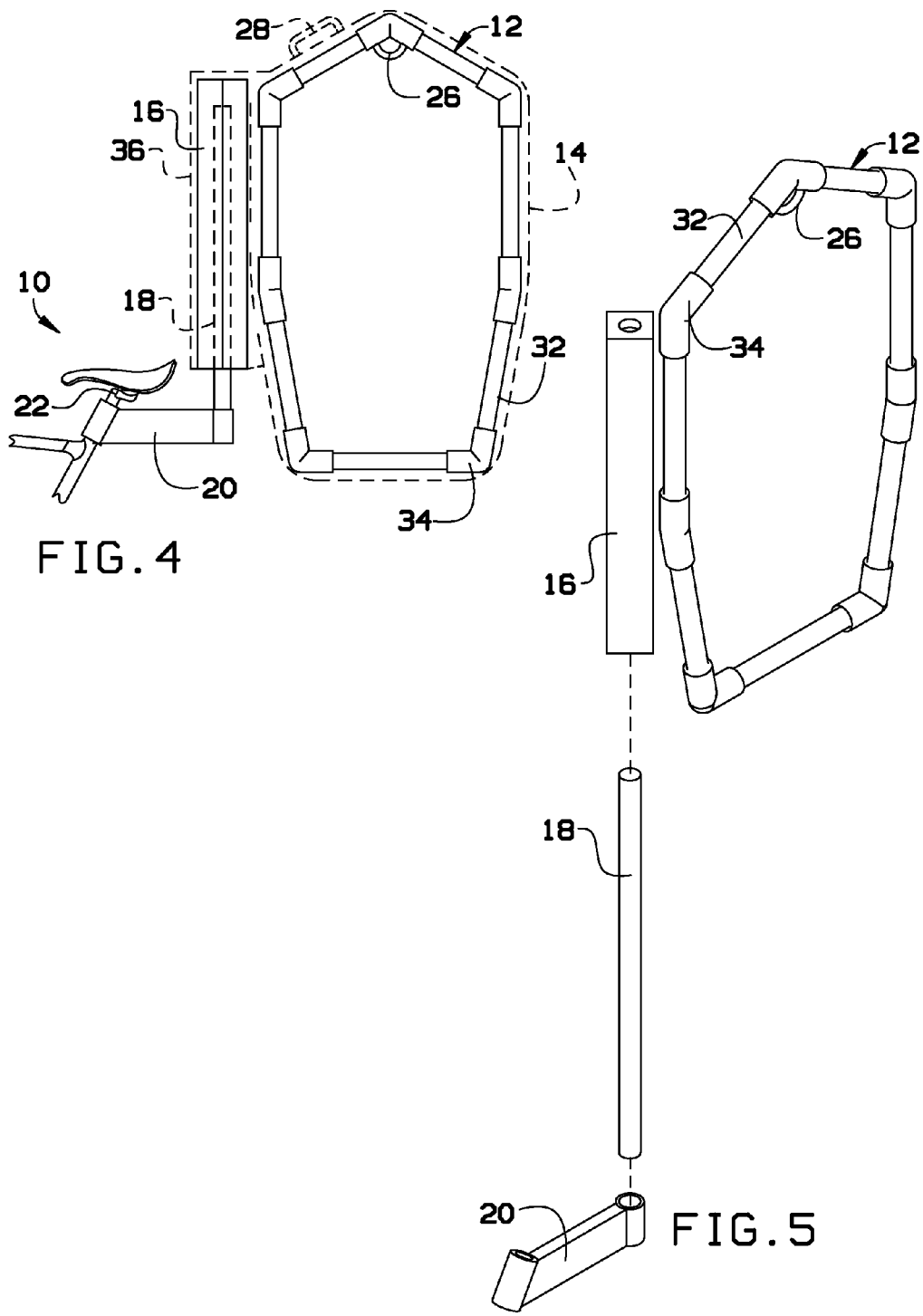

BICYCLE GARMENT CARRIER ATTACHMENT

CROSS-REFERENCE TO RELATED APPLICATION

This application claims the benefit of priority of U.S. provisional application No. 61/639,978, filed Apr. 29, 2012, the contents of which are herein incorporated by reference.

BACKGROUND OF THE INVENTION

The present invention relates to a bicycle accessory and, more particularly, to a stable and aerodynamic bicycle attachment that stows hanged garments on the bicycle, typically behind the bicyclist during travel.

Packing garments in conventional bicycle garment carriers is time consuming. Garments become wrinkled when they are folded and packed. Hanging or attaching hanged garments or garment bags on existing bicycle article carriers creates resistance to wind during travel, making it harder for the bicyclist to pedal. Also, shift in winds can hinder the balance of the bicyclist.

Other systems don't work well because they are unsafe, are time consuming to use, cause wrinkles in garments, and disrupt the bicyclist's stability during use. Other devices require a user to fold or pack garments, which can be time consuming and cause wrinkles. Devices which allow garments to be hung do not come with an enclosure and do not compensate for shifts in the wind.

As can be seen, there is a need for an improved device for stowing hanged garments on a bicycle during travel.

SUMMARY OF THE INVENTION

In one aspect of the present invention, a device for transporting hanged garments comprises a pod enclosure having an exterior perimeter defining a hanged garment storage region within the pod enclosure; a bar attached to the pod enclosure; a rod onto which the bar can removably attach; and a bracket for supporting the rod, wherein the bracket is adapted to attach to a bicycle.

In another aspect of the present invention, a bicycle garment carrier attachment comprises a pod enclosure having an interior defined by a plurality of frame pipes and frame joints; a hook formed in the interior of the pod enclosure, the hook operable to allow a user to hang articles in the pod enclosure; a bar attached to the pod enclosure; a rod onto which the bar can removably attach and pivot thereabout; and a seat bracket for supporting the rod to a bicycle seat.

These and other features, aspects and advantages of the present invention will become better understood with reference to the following drawings, description and claims.

BRIEF DESCRIPTION OF THE DRAWINGS

FIG. 4 is a side view of the bicycle garment carrier attachment of FIG. 1, with the pod enclosure shown in phantom to demonstrate the relationship of the inner components thereof; and FIG. 5 is an exploded perspective view of the components of the bicycle garment carrier attachment of FIG. 1.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a hanged garment device that can semi-permanently attach to the back of a bicycle to securely stow hanged garments in a removable, aerodynamic pod. Because the hanged garment device is shaped to reduce wind resistance and can rotate to accommodate change in wind direction, the hanged garment device does not hinder bike stability during travel. The hanged garment device does not disrupt bicyclist stability during shifts in the wind while allowing hanged garments to be stowed securely on the bicycle, typically behind the bicyclist during travel.

Figure 1:
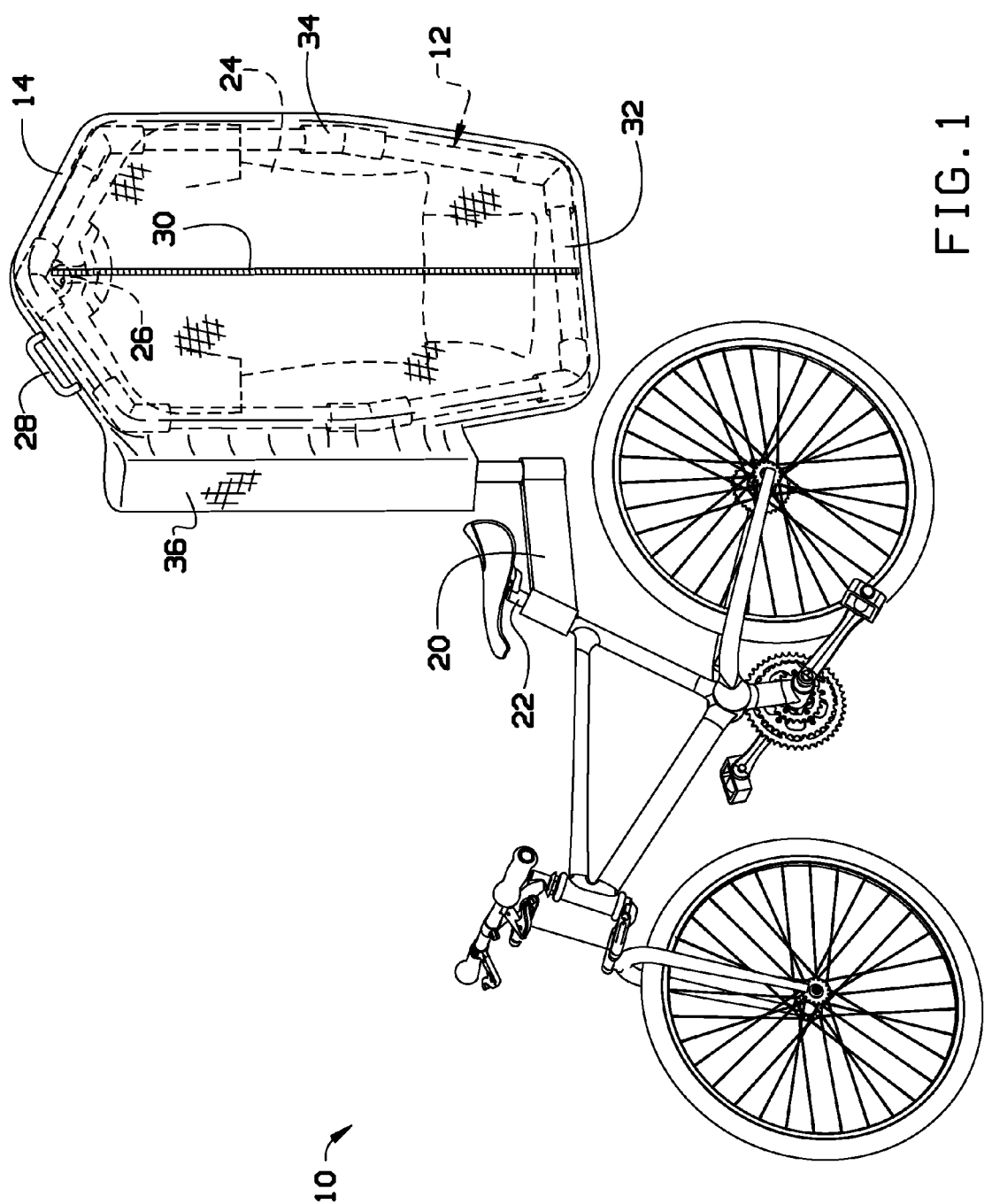
FIG. 1 is a side view of a bicycle garment carrier attachment according to an exemplary embodiment of the present invention.
Figure 2:
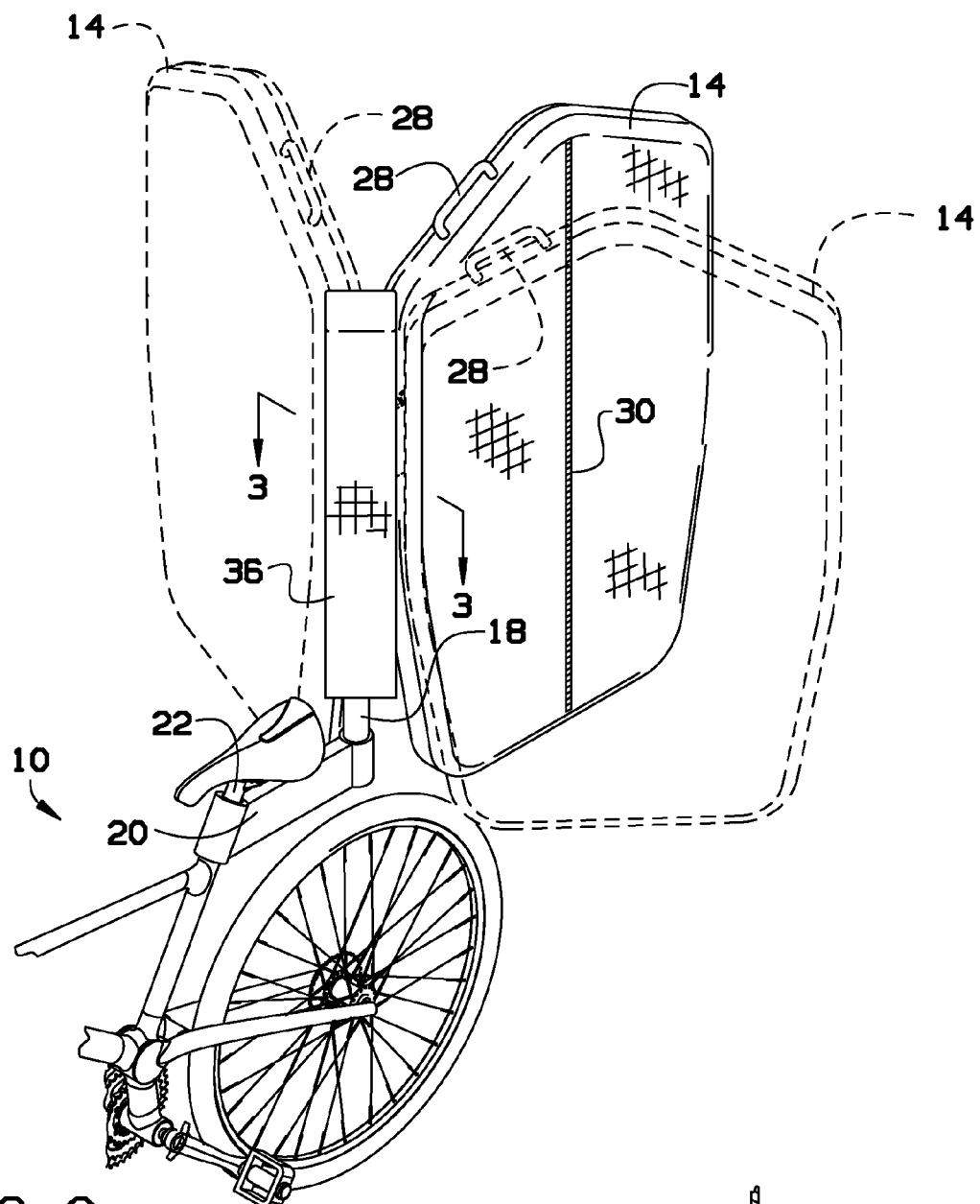
FIG. 2 is a detailed perspective view of the bicycle garment carrier attachment of FIG. 1, illustrating pivot motion thereof.
Figure 3:
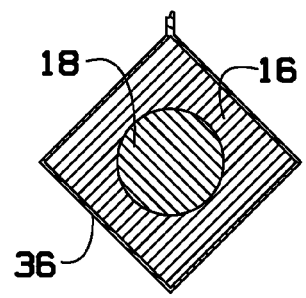
FIG. 3 is a cross-sectional view taken along line 3-3 of FIG. 2.

Referring to FIGS. 1 through 5, a bicycle 10 can include a seat bracket 20 attached to the seat shaft 22, extending rearward behind the seat and above the rear wheel of the bicycle 10. A rod 18 can extend upward (away from the rear wheel) from the seat bracket 20. A bar 16 can surround the rod 18 and pivot thereupon. In certain embodiments, the bar 16 may be made of a hi-density plastic and may have a bore hole opening at the bottom end and may be closed at the top end. The rod 18 may fit within the open end. A sleeve 36 can be disposed on the bar 16 to provide a finished appearance.

A frame can be formed from plurality of frame pipes 32 can be joined with frame joints 34 to form a region for hanging clothes. A hook 26 can be disposed at a top central portion of the frame. The frame can be made in various shapes. For example, as shown in the Figures, the frame pipes 32 and frame joints 34 can form a shape similar to a conventional garment bag. Of course, other shapes are contemplated within the scope of the present invention.

A pod enclosure 14 can be used to enclose the frame and attach the frame to the bar 16. A handle 28 can be formed on the outside of the pod enclosure 14, allowing a user to lift the pod enclosure 14 from the rod 18, allowing the user to carry the pod enclosure 14 to a desired location, with or without clothes 24 hanging inside. An enclosure, such as a zipper 30, can be provided to permit a user to access the inside of the pod enclosure 14.

Clothes 26 hung on a hanger can be inserted into the pod enclosure 14 and hung on the hook 26. The pod enclosure 14 can then be inserted over the forward facing rod 18 attached to the seat post 22. The pod enclosure 14 can rotate about the fixed rod 18, allowing the device to rotate and compensate for wind shift. In some embodiments, there may be a spring mechanism adapted to resiliently dispose the pod enclosure 14 in-line with the bicycle's path of travel. This resistance, however, is not so great that it inhibits the pod enclosure 14 to rotate with changing wind direction.

In some embodiments, stops can be provided to prevent the pod enclosure 14 from pivoting to a degree that it inhibits the bicycle rider. The stops may ensure, for example, that the pod enclosure 14 is always pointed rearward.

The device of the present invention may be made from various material by methods known in the art. For example, the rods may be made of plastic or aluminum, for example and the pod may be made of fabric, plastic or the like. A shoulder strap may be added to the pod enclosure to help carry the pod enclosure when it is not attached to the bicycle.

The device of the present invention may include advertising or other designs or insignias on the sides of the pod enclosure, for example. The device of the present invention may be used on other vehicles, such as motorcycles, trikes, golf carts or the like.

While the above description discusses using the device of the present invention to carry clothes, such as hanged garments, the device may be used to carry various objects, depending on the intended application. For example, the device of the present invention may be useful to carry art work or other similar sheet-like material that may otherwise be difficult to transport.

It should be understood, of course, that the foregoing relates to exemplary embodiments of the invention and that modifications may be made without departing from the spirit and scope of the invention as set forth in the following claims.

What is claimed is:

1. A device for transporting hanged garments, comprising:
   a pod enclosure having an exterior perimeter defining a hanged Garment storage region within the pod enclosure;
   a bar attached along a vertical portion of the pod enclosure, wherein the bar is substantially rigid, and comprises a top end and a bottom end, wherein the bottom end forms an opening leading into an internal slot of the bar;
   a rod insertable into the internal slot of the bar through the opening, onto which the bar can removably attach; and
   a bracket for supporting the rod, wherein the bracket is adapted to attach to a bicycle.

2. The device of claim 1, further comprising a plurality of frame pipes and frame joints defining the hanged garment storage region.

3. The device of claim 1, wherein the bracket is a seat bracket extending from a seat shaft of the bicycle.

4. The device of claim 1, further comprising an enclosure openable to access the hanged garment storage region.

5. The device of claim 4, wherein the enclosure is a zipper.

6. The device of claim 1, wherein the bar is covered with a sleeve.

7. The device of claim 1, further comprising a hook formed in the hanged garment storage region of the pod enclosure, the hook operable to allow a user to hang articles in the pod enclosure.

8. A bicycle garment carrier attachment comprising:
   a pod enclosure having an interior defined by a plurality of frame pipes and frame joints;
   a hook formed in the interior of the pod enclosure, the hook operable to allow a user to hang articles in the pod enclosure;
   a bar attached along a vertical portion of the pod enclosure, wherein the bar comprises a top end and a bottom end, wherein the bottom end forms an opening leading into an internal slot of the bar;
   a rod insertable into the internal slot of the bar through the opening, onto which the bar can removably attach and pivot thereabout; and
   a seat bracket for supporting the rod to a bicycle seat.

9. The bicycle garment carrier attachment of claim 8, further comprising a zipper openable to access an interior of the pod enclosure.

* * * * *